United States Patent
Sanson et al.

(10) Patent No.: US 10,458,842 B2
(45) Date of Patent: Oct. 29, 2019

(54) LOW FLUX AND LOW NOISE DETECTION CIRCUIT

(71) Applicant: SOCIÉTÉ FRANÇAISE DE DÉTECTEURS INFRAROUGES—SOFRADIR, Palaiseau (FR)

(72) Inventors: Eric Sanson, Grenoble (FR); Sébastien Aufranc, Grenoble (FR)

(73) Assignee: SOCIÉTÉ FRANÇAISE DE DÉTECTEURS INFRAROUGES—SOFRADIR, Palaiseau (FR)

( * ) Notice: Subject to any disclaimer, the term of this patent is extended or adjusted under 35 U.S.C. 154(b) by 158 days.

(21) Appl. No.: 15/818,220

(22) Filed: Nov. 20, 2017

(65) Prior Publication Data
US 2018/0143072 A1 May 24, 2018

(30) Foreign Application Priority Data
Nov. 21, 2016 (FR) .................................. 16 61322

(51) Int. Cl.
| G01J 1/46 | (2006.01) |
|---|---|
| H04N 5/33 | (2006.01) |
| H04N 5/361 | (2011.01) |
| H04N 5/363 | (2011.01) |
| H04N 5/3745 | (2011.01) |
| G01J 5/22 | (2006.01) |

(52) U.S. Cl.
CPC . *G01J 1/46* (2013.01); *G01J 5/22* (2013.01); *H04N 5/33* (2013.01); *H04N 5/361* (2013.01); *H04N 5/363* (2013.01); *H04N 5/3745* (2013.01)

(58) Field of Classification Search
CPC ....... H04L 51/32; H04L 67/42; H04L 67/306; G06F 3/0484; G06F 3/04817; G06F 3/0482; G06Q 50/01
See application file for complete search history.

(56) References Cited

U.S. PATENT DOCUMENTS 8,803,064 B2 * 8/2014 Mizuno .................... G01J 1/46
250/214 A

FOREIGN PATENT DOCUMENTS

| EP | 2600125 A1 | 6/2013 |
|---|---|---|
| WO | 2013/083889 A1 | 6/2013 |

* cited by examiner

*Primary Examiner* — Tony Ko
(74) *Attorney, Agent, or Firm* — Oliff PLC

(57) ABSTRACT

The detection circuit comprises a detector connected to an integration node. A bias circuit biases the detector between a first bias state and a second floating state. The potential of the integration node is at a target value when the bias circuit biases the detector to the first state and varies when the detector is in floating state. A measurement circuit without charge losses delivers a value representative of the potential present on the integration node N. A transfer circuit of the electric charges performs transfer of the electric charges from a stray capacitor of the photodiode to an integration capacitor. An output terminal delivers a voltage representative of the potential present on the second terminal of the first capacitor.

18 Claims, 3 Drawing Sheets

LOW FLUX AND LOW NOISE DETECTION CIRCUIT

BACKGROUND OF THE INVENTION

The invention relates to a detection circuit.

STATE OF THE ART

Optic detection circuits generally comprise a photodetector connected to a readout circuit. The function of the readout circuit is to convert and if necessary to amplify the signal coming from the photodetector so that it can be processed.

FIG. 1 represents an example of a detection circuit commonly used with photodetectors. The circuit comprises a photodetector 1 and a readout circuit 2. One terminal of the photodetector 1, the cathode in the example of FIG. 1, is connected to the readout circuit 2. The other terminal of the photodetector 1, the anode for example, is connected to the potential of the photodetector substrate $V_{SUB}$.

The readout circuit 2 can be of integrator type. It performs two functions—firstly it integrates the current $I_1$ of the photodetector 1 and thus converts the current into a usable voltage $V_S$, and secondly it performs biasing of the photodetector 1. For example purposes, the readout circuit 2 can be formed by a capacitive transimpedance amplifier (CTIA) represented in FIG. 1. Such an integrator comprises an operational amplifier 3. The first input of the amplifier 3, the negative input, forms the input of the readout circuit 2, and the output of the amplifier 3 forms the output of the readout circuit 2. The second input of the amplifier, the positive input in the example of FIG. 1, receives a reference potential $V_{REF}$. The readout circuit 2 also comprises an integration capacitor C1 and a reset switch S1 connected in parallel between the first input of the amplifier and the output of the amplifier. The output of the readout circuit 2 delivers the voltage $V_S$ representative of the received signal.

This embodiment is particularly efficient for detection and management of medium or weak optic signals, but this efficiency is obtained to the detriment of size and consumption. Furthermore, when the photodetector receives a light flux of very low intensity, the signal-to-noise ratio is in fact impaired by the emission of stray photons emitted by the amplifier implanted in the pixel and it is very difficult to obtain attractive performances.

In order to obtain very sensitive sensors, the detection circuit is engineered in particular manner by means of an SFD (Source Follower per Detector) architecture illustrated in FIG. 2. This type of sensor operates with weak radiation conditions, i.e. with a low incident flux.

As in conventional detectors, the incident radiation is converted into a quantity of electrons which is representative of the observed scene. For this type of sensor, it is important to limit the electronic noise generated by the detection circuit, i.e. the quantity of electrons not linked to the observed scene. The first means for reducing the quantity of stray electrons is to limit the electric consumption of the circuit which incites the detection circuit to be simplified. Integration of the charges emitted by the photodetector is then performed by the internal capacitor of the photodetector.

As illustrated in FIG. 2, the detection circuit comprises a photodiode 1 with so its internal capacitor $C_{PD}$. The circuit also comprises a reset transistor T1 which performs the connection between the photodetector 1 and a bias voltage Vreset. Switching of the reset transistor T1 between a saturated On state and an Off state makes the photodiode 1 switch between a reverse bias and a floating state.

When the photodiode 1 is in a floating state, the electric charges generated are stored in the stray capacitor $C_{PD}$. As the electric charges are progressively stored in the capacitor $C_{PD}$, the voltage at the terminals of the photodiode 1 changes. This change of bias conditions generally results in an impairment of the integrity of the signal, for example with a modification of the conversion rate of the electromagnetic radiation received into a quantity of electrons, by the variation of the capacitance value of capacitor $C_{PD}$ or by the increase of the stray leakage current in the detector.

The photodiode 1 is also connected to a processing circuit 4 which processes the signal emitted by the photodiode 1.

The charges generated by the photodiode 1 are partly stored by the internal capacitor $C_{PD}$ of the photodiode 1 which results in a modification of the potential of the integration node N connected to the processing circuit 4. The electric capacitance of the integration node N results partially from the electric capacitance of the photodiode 1 and partially from the stray capacitances of the other components connected to the integration node N.

However, in this architecture, a high noise level always exists in terms of electrons in low flux detectors. These architectures further present a low linearity in conversion of the light signal into an electric signal, as detection is performed leaving the photodetector at a floating potential which changes as the capacitor $C_{PD}$ progressively charges. This non-linearity along with the loss of integrity of the signal limits the amplitude of the signal and therefore the number of storable charges, which limits the signal-to-noise ratio. This problem is particularly substantial for detectors which only tolerate small variations on their bias potential, for example LWIR band infrared detectors.

OBJECT OF THE INVENTION

It is observed that a requirement exists to provide a detection circuit which enables a better correlation to be obtained between the optic signal received and the electric signal generated.

This requirement tends to be fulfilled by means of a circuit which comprises:
 a detector provided with a stray capacitor and configured to deliver electric charges according to an observed phenomenon,
 a bias circuit configured to bias the detector during a first period and to leave a first terminal of the detector at a floating potential during a second period.

The circuit is remarkable in that it comprises:
 a first capacitor having a first terminal connected to the first terminal of the detector to form an integration node with the stray capacitor, the integration node being at a target value during the first period and changing during the second period,
 a transfer circuit of the electric charges from the stray capacitor to the first capacitor, the electric charge transfer circuit being configured to bias a second electrode of the first capacitor so as to shift the potential of the retention node to the target value,
 an output terminal delivering a voltage representative of the potential present on the second terminal of the first capacitor.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERENTIAL EMBODIMENTS OF THE INVENTION

Figure 1:
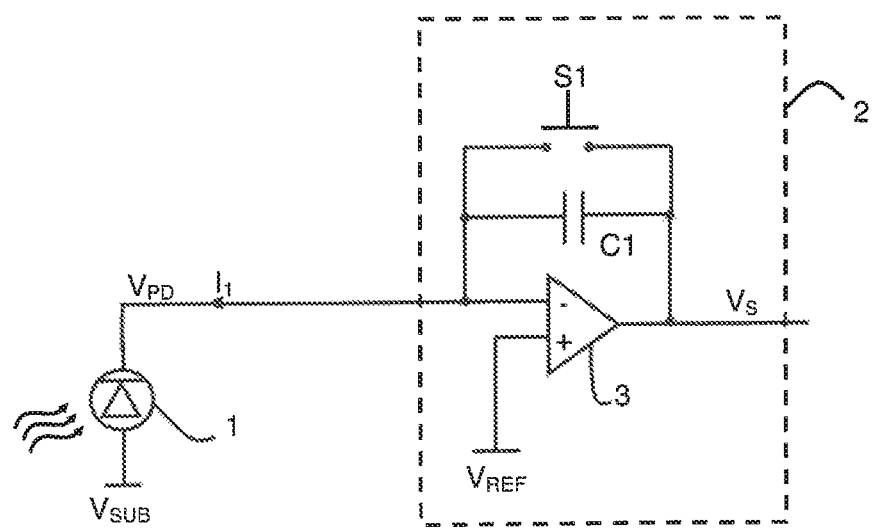
FIG. 1 represents a detection circuit of capacitive transimpedance amplifier type, in schematic manner.
Figure 2:
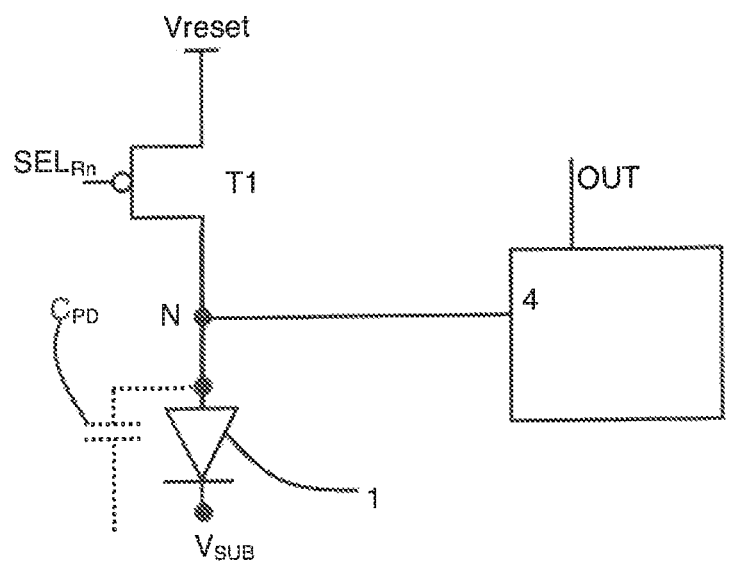
FIG. 2 represents a detection circuit of SFD type, in schematic manner.
Figure 3:
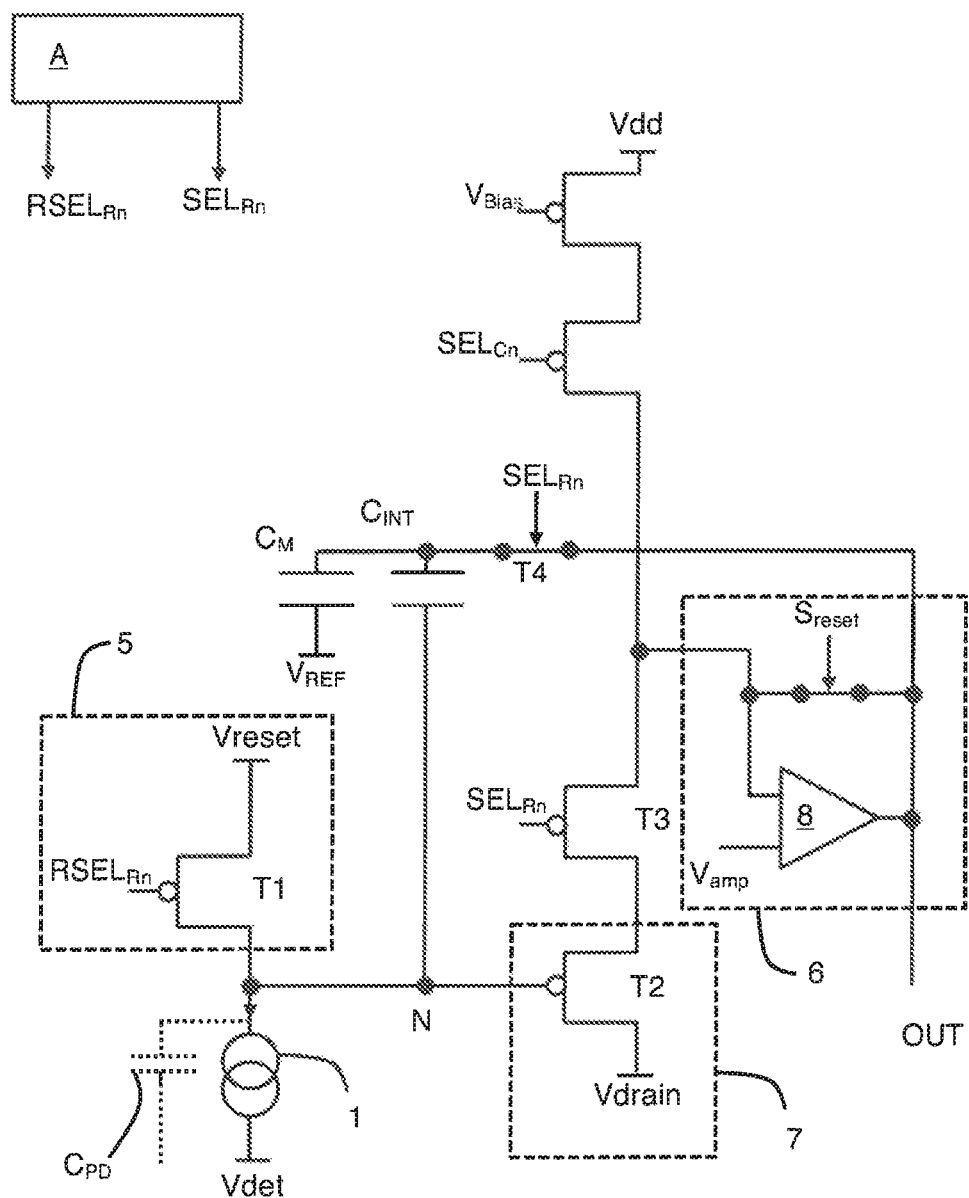
FIG. 3 represents a particular embodiment of a detection circuit according to the invention, in schematic manner.

As illustrated in FIG. 3, the detection circuit partially presents an assembly of SFD (Source Follower per Detector) type. The detection circuit comprises a photodetector 1 which is preferentially a photodiode. Photodetector 1 is associated with a bias circuit 5. Bias circuit 5 biases photodetector 1 between first and second different states corresponding to first and second periods.

During the first period, photodetector 1 is in the first state, photodetector 1 advantageously being reverse biased. During the second period, the photodetector is in the second state, photodetector 1 being left in a floating state where the initial bias, for example reverse bias, changes according to the accumulation of received charges, in this case the change takes place to forward bias. Acquisition of the electromagnetic signal is performed when photodetector 1 is in the second state, i.e. during the second period. Setting to floating state is achieved by leaving the electrode initially connected to bias circuit 5 at a floating potential.

In the embodiment illustrated in FIG. 3, photodetector 1 is represented schematically as a current source as it delivers electric charges according to the electromagnetic radiation received. Photodetector 1 can be a photodiode, a quantum well or multi-quantum well device, or any other detector that is configured to transform incident electromagnetic radiation into electric charges.

In the embodiment illustrated in FIG. 3, bias circuit 5 is formed in compact manner by means of a switch T1 which connects a bias voltage Vreset source to a first electrode of photodetector 1. By toggling switch T1 between the on and off state, it is possible to switch photodetector 1 between a reverse bias state and a floating state. In a particularly compact embodiment, switch T1 is formed by a transistor and advantageously by a field effect 16 transistor. The control electrode of switch T1 is connected to a control circuit A, for example a signal generator which emits the signal $RSEL_{Rn}$. According to the signal received, switch T1 switches between on and off state and photodetector 1 switches between a reverse bias and a floating state. The second electrode of photodetector 1 is connected to a voltage source which delivers the voltage Vdet. The signal $RSEL_{Rn}$ enables the first and second periods to be defined.

The detection circuit comprises an integration node N formed by the connection between the first electrode of photodetector 1 and the first electrode of a first capacitor also called integration capacitor $C_{INT}$. In other words, integration node N is formed by stray capacitor $C_{PD}$ and integration capacitor $C_{INT}$. Integration node N is also connected to bias circuit 5.

During the acquisition period, i.e. the second period, photodetector 1 is in its floating state, i.e. it is connected to the capacitive integration node N which conserves the electric charges generated by the photodetector. Photodetector 1 transforms light radiation into electric charges which are stored in stray capacitor $C_{PD}$ and also in integration capacitor $C_{INT}$. Accumulation of the electric charges in these two capacitors will result in a modification of the potential of capacitive integration node N. When bias 6 circuit 5 sets photodetector 1 to a floating potential, integration node N sees its potential change as the electric charges are progressively generated and stored in capacitors $C_{PD}$ and $C_{INT}$.

As indicated above, as the bias of integration node N changes, the bias conditions of photodetector 1 are modified which may, beyond a certain threshold, impair the integrity of the signal. In other words, for a given received instantaneous optic signal, photodetector 1 may generate different quantities of electric charges depending on its bias state.

This impairment of the integrity of the signal makes comparison of two quantities of electrons stored on integration node N more difficult in quantitative manner. In order to be able to compare two items of data stored on integration node N more easily, the device comprises a modulation circuit of the power supply conditions of photodetector 1 whereas the latter is at a floating potential, i.e. during the second period.

The modulation circuit is configured to set photodetector 1 back to its initial bias state without eliminating the generated electric charges or at least to set the photodetector to a state that is close to its initial state defined during the first period. The bias conditions at the terminals of the photodetector being more stable in time, it is then easier to compare two electric signals to compare two optic signals in quantitative manner.

In advantageous manner, modification of the bias at the terminals of so photodetector 1 is performed by transfer of at least a part of the electric charges stored in capacitor $C_{PD}$ to integration capacitor $C_{INT}$. Whereas in the prior art, the electric charges are eliminated to revert to the initial bias state, in this embodiment the electric charges are transferred to prevent the introduction of stray electric charges. Transfer of the charges takes place during the acquisition period.

The detection circuit advantageously comprises a transfer circuit 6 configured to transfer electric charges from capacitor $C_{PD}$ to integration capacitor $C_{INT}$. Transfer of the charges enables at least a part of the charges accumulated in stray capacitor $C_{PD}$ to be removed and to be transferred to integration capacitor $C_{INT}$. Transfer of the charges generated and stored in capacitor $C_{PD}$ enables the fluctuations in the bias conditions of photodetector 1 to be limited. In this way, for the same optic signal, photodetector 1 generates substantially the same quantity of electric charges over a longer time period and it is therefore easier to quantitatively compare the received signals.

Transfer circuit 6 is advantageously configured to disable transfer of the electric charges when the potential of the integration node reaches a predefined value. This predefined value is advantageously equal or close to the target value defined during the first period.

Transfer of the charges takes place within integration node N by displacement of the charges between its different capacitive components.

Transfer of the electric charges from capacitor $C_{PD}$ to capacitor $C_{INT}$ is performed by injecting electric charges into the second electrode of capacitor $C_{INT}$. For example, transfer of the electric charges is performed by modifying the bias of the second electrode of capacitor $C_{INT}$, for example by applying a voltage on the second electrode.

In comparison with an embodiment where a fixed number of electric charges are transferred from capacitor $C_{PD}$ to capacitor $C_{INT}$ each time transfer circuit 6 is activated, it is advantageous to transform all the stored electric charges so as to reset photodetector 1 to predefined conditions and preferentially to bias conditions closer to the start of the acquisition period.

It is then advantageous to use a measurement circuit 7 of the potential value of integration node N which is configured to measure the potential value of integration node N.

This particular architecture enables the potential value of integration node N to be measured. It is then possible to initiate and/or terminate transfer of the electric charges from capacitor $C_{PD}$ to integration capacitor $C_{INT}$ according to the potential value of integration node N.

Transfer may be conditioned on the potential of integration node N reaching a threshold value measured by measurement circuit 7.

By resetting integration node N to a target value which is close to the conditions defined in the first period, photodetector 1 will also be reset to bias conditions close to those defined by the first period. If several transfers are performed during the second period, using a constant or substantially constant target value enables the repeatability of the measurements to be enhanced.

In a particular embodiment, measurement circuit 7 of the potential value of integration node N can be activated before electric charge transfer circuit 6. In this way, measurement circuit 7 will measure the value of the potential at integration node N and, if the latter reaches the threshold value, this triggers transfer of electric charges from capacitor $C_{PD}$ to capacitor $C_{INT}$. When transfer of the charges takes place, measurement circuit 7 can be active and measures the potential of integration node N. Measurement circuit 7 stops transfer of the electric charges when the potential of integration node N reaches the target value.

As a preferential variant, measurement circuit 7 of the potential value of integration node N and electric charge transfer circuit 6 are activated simultaneously so that transfer of the charges takes place until the potential of integration node N reaches the target value.

In a particular embodiment, measurement circuit 7 comprises a transistor T2 connected as follower so that the potential of integration node N modulates the voltage delivered by transistor T2. Integration node N is connected to the control electrode of transistor T2.

Transistor T2 is advantageously a field effect transistor so that integration node N is completely insulated electrically from the other components of the circuit. This electric insulation prevents electric charges from being lost from the node N or injected into the node N thereby avoiding introducing a deviation from what has been actually detected by the photodetector. The generated signal is no longer distorted and a better correlation between the optic signal received and the electric signal can be obtained. In other words, the signal is less impaired than in circuits of the prior art.

The electric charges generated by photodetector 1 cannot be lost as integration node N is completely insulated from the other components of the circuit, i.e. by the insulating layer forming integration capacitor $C_{INT}$, by the gate insulator of transistor T2 and by the insulators of the capacitors.

Integration node N is connected to measurement circuit 7 so that the latter delivers data representative of the potential at the node N. Depending on the so embodiments, circuit 7 can be configured to deliver digital data or analog data.

This data is delivered to transfer circuit 6 to initiate and/or disable transfer of the electric charges.

For example purposes as illustrated in FIG. 3, the voltage delivered by transistor T2 changes in analog manner with the potential value of integration node N. If a voltage represented in digital form is required, it is possible to connect an analog-to-digital converter on output of transistor T2, which converter will deliver digital data representative of the measured value.

Transfer circuit 6 can be achieved in different manners. In one example, activation and disabling of the transfer circuit are linked to emission of signals by measurement circuit 7 which emits signals of ON/OFF type. Measurement circuit 7 can emit an activation signal of transfer circuit 6 so long as the potential of node N does not reach the target value.

In other exemplary cases, the signals emitted by measurement circuit 7 are representative of the potential of node N which enables transfer circuit 6 to make node N converge more easily on the target value.

In advantageous manner, the signal emitted by measurement circuit 7 is analysed in real time in order to apply a voltage on the second electrode of capacitor $C_{INT}$ and to make node N converge to the target value.

In other cases, the signals emitted by measurement circuit 7 are analysed and analysis of these signals enables a charge or a current sent to the second electrode of capacitor $C_{INT}$ to be modulated.

In a preferential embodiment illustrated in FIG. 3, transfer circuit 6 comprises an amplifier 8 and the voltage delivered by transistor T2 is applied to the input of amplifier 8. The other input of amplifier 8 is connected to a voltage source which delivers a voltage Vamp, here voltage Vamp is advantageously offset from voltage Vreset by a value equal to the threshold voltage of transistor T2. Transfer circuit 6 is also configured to deliver the voltage value which enables the charges to be transferred from detector 1 and from its stray capacitor $C_{PD}$ to integration capacitor $C_{INT}$.

In this manner, when transfer circuit 6 receives data indicating that node N has strayed from its target value, amplifier 8 delivers the signal to be applied to transfer the charges from capacitor $C_{PD}$ to capacitor $C_{INT}$ and transfer circuit 6 applies this signal to capacitor $C_{INT}$. The second electrode of capacitor $C_{INT}$ charges until the electric charges stored in capacitor $C_{PD}$ have been transferred to capacitor $C_{INT}$ and the potential of node N has reverted to the initial potential. At this time, the measurement circuit delivers data, for example a voltage, indicating that node N is at the target value and the output of transfer circuit 6 stabllises at the value representative of the received signal and stops charging capacitor $C_{INT}$. The value representative of the received signal is available on the output OUT of transfer circuit 6. Transfer circuit 6 can be shut down and the electric charges accumulated in the second electrode of capacitor $C_{INT}$ are kept, and integration node N can be charged again with new electric charges generated by photodetector 1.

In advantageous manner, amplifier 8 is formed by an operational amplifier. In this way, the output of amplifier 8 is feedback connected in integrator mode and delivers on output a suitable voltage to make the voltage delivered by transistor T2 converge to voltage Vamp, i.e. to make node N converge to its initial value. This embodiment is particularly advantageous as it enables the output of comparator 8 to be connected directly on the second electrode of capacitor $C_{INT}$ and at the same time enables a signal representative of the optic signal to obtained on output of the same amplifier.

In the case where amplifier 8 is formed by an operational amplifier, it is advantageous to perform reset of the second electrode of capacitor $C_{INT}$ by short-circuiting the output terminal of amplifier 8 with its input terminal connected to measurement circuit 7. Short-circuiting can be performed by means of a switch which receives signal $S_{reset}$ from a signal generator on its control electrode.

As a variant, the measurement circuit or the transfer circuit can be configured to deliver data representative of the difference between the voltage value measured on integration node N and the target value or a value representative of the target value. This data representative of the difference is used to define the voltage variation to be applied on the second terminal of capacitor $C_{INT}$ or of the quantity of electric charges to be applied on the second electrode of capacitor $C_{INT}$.

Although transfer circuit 6 is illustrated in a configuration with an amplifier which is particularly advantageous to facilitate conversion to the target value, it is also possible to use a comparator to charge capacitor $C_{INT}$.

In an embodiment illustrated in FIG. 3, measurement circuit 7 is configured to deliver a voltage representative of the charges received by detector 1 and stored on node N. When the voltages have converged, node N is in fact at its initial value which is known, and the charges of the detectors are all transferred to capacitor $C_{INT}$r, the second electrode of capacitor $C_{INT}$ is then at a potential representative of the charges coming from the detector, and this potential is identical to that of output OUT.

In another particular embodiment illustrated in FIG. 3 and which can be combined with the other previously described embodiments, the second so electrode of capacitor $C_{INT}$ is connected to an additional capacitor also called memory capacitor $C_M$.

The second electrode of capacitor $C_{INT}$ is connected to the first electrode of a memory capacitor $C_M$. The second electrode of memory capacitor $C_M$ is connected to a second reference voltage source, here voltage $V_{REF}$. The second reference voltage source delivers a fixed potential.

It is advantageous to use memory capacitor $C_M$ so as to store the voltage applied by circuit 6 when the latter charges capacitor $C_{INT}$ and to keep this voltage on the second electrode of capacitor $C_{INT}$. In the embodiment of FIG. 3, preservation of this data can be achieved by placing switch T4 in the open state and for example by shutting circuit 6 down. In this way, the voltage present on the second electrode of capacitor $C_{INT}$ can be maintained for a longer time and in more precise manner thus enabling the potential of node N to be stabilised thereby reducing the potential change during the 16 acquisition period. The charges stored on capacitor $C_M$ are not necessarily representative of the electric charges generated by the photodetector.

Charging of the second electrode of capacitor $C_{INT}$ means that the first electrode of capacitor $C_M$ is also charged. In this way, the voltage present on the second electrode of capacitor $C_{INT}$ can be maintained for a longer time.

The sum of the electric charges generated by photodetector 1 is stored in stray capacitor $C_{PD}$ and then in integration capacitor $C_{INT}$ as the transfers progressively take place. When circuit 6 has transferred the electric charges to capacitor $C_{INT}$, the voltage present on the second electrode of capacitor $C_{INT}$ is representative of all the generated electric charges and therefore of the optic signal received during the whole of the acquisition period.

When circuit 6 has transferred the electric charges to capacitor $C_{INT}$, the so second terminal of capacitor $C_{INT}$ is connected to the output of the detection circuit so as to deliver a signal representative of the optic signal received. The output of the detection circuit can be connected to an analysis circuit (not shown).

In preferential manner, the target value for node N corresponds to the value of the potential of node N when photodetector 1 is in the first state. In the embodiment illustrated in FIG. 3 and which is particularly advantageous as it is compact, voltage Vamp applied on the positive input of operational amplifier 8 is equal to voltage Vreset shifted by the value of the threshold voltage of transistor T2 when this transistor is in follower mode. In this way, circuit 6 is configured so that the voltage applied on the second electrode of capacitor $C_{INT}$ resets integration node N to voltage Vreset as bias circuit 5 would do on initialisation of photodetector 1.

Although the detection circuit can perform continuous transfer of the charges generated by photodetector 1, it is particularly advantageous to perform transfer of the electric charges in periodic manner, i.e. with alternations of transfer phases and accumulation phases.

By periodically measuring the value of the potential present on integration node N and by transferring the stored electric charges, it is possible to prevent the bias conditions of photodetector 1 from fluctuating greatly. It is then possible to compare the received optic signals in quantitative manner by comparing the stored electric signals.

In order to limit the electric consumption of the detection circuit, it is particularly advantageous not to perform measurement of the potential of integration node N continuously but preferentially periodically. The same is the case for transfer of the electric charges from capacitor $C_{PD}$ to integration capacitor $C_{INT}$.

In a particularly advantageous embodiment as it is compact, in order to facilitate implementation of these actions in periodic manner, the circuit advantageously comprises a switch T3, advantageously a switch T3 which is connected between the output of measurement circuit 7 of the potential of integration node N, formed here by transistor T2, and the input of transfer circuit 6. In the embodiment of FIG. 3, switch T3 more particularly connects the output of transistor T2 to the first input of amplifier 8.

If measurement of the potential at integration node N and/or transfer of the electric charges are performed periodically, it is possible not to supply power to these measurement and transfer circuits when they are not used. A gain in power consumption is then obtained. This reduced consumption enables the stray photon emission to be reduced and the integrity of the received optic signal to be improved.

If charge transfer is performed at least once and preferably in periodic manner, the acquisition period can be broken down into at least two distinct phases. In a first phase also called integration phase, the optic signal received by the photodetector generates electric charges which are stored in capacitor $C_{PD}$ and in capacitor $C_{INT}$. In this first phase, switches T3 and T4 are in off state, i.e. open. The potential of integration node N changes progressively as the electric charges are stored.

In the second phase, also called transfer phase, switches T3 and T4 are in on state, i.e. closed. The potential of integration node N is measured and a voltage is applied on the second electrode of capacitor $C_{INT}$ so that the potential of integration node N is for example equal to the target value. During the two phases of the acquisition period, photodetector 1 is in a so floating state and generates electric charges according to the optic signal received.

As indicated in the foregoing, depending on the embodiments, switches T3 and T4 can be switched simultaneously by receiving the same signal on their control electrode. This exemplary case is illustrated in FIG. 3 where switches T3 and T4 receive the same signal $SEL_{Rn}$. It is also possible to provide for switches T3 and T4 to receive different signals, the independent and appropriate commands of T3 and T4 for example reducing the disturbances on integration node N when switching takes place. Transistor T4 can be actuated in logic manner between the on and off states. However, it is particularly advantageous to define at least two on states, one of which limits the quantity of current able to flow through the transistor. This precaution prevents the occurrence of too abrupt transitions of electric charges which have the effect of impairing the integrity of the signal.

By applying, on the second terminal of capacitor $C_{INT}$, the voltage necessary for the potential of integration node N to be reset to its initial conditions or to approach its initial conditions, i.e. its bias at the beginning of the acquisition period, the charges of integration node N present on stray capacitor $C_{PD}$ are shifted onto integration capacitor $C_{INT}$.

Shifting of the charges enables integration node N to be reset to an identical or substantially identical bias level to that of the beginning of the acquisition period, which enables the photodetector to be reset to an identical or almost identical bias state to that of the beginning of the acquisition period.

As the transfer cycles are performed, the number of electric charges stored in capacitor $C_{INT}$ progressively increases. The voltage present on the second electrode of capacitor $C_{INT}$ at the end of the second period is representative of the total number of electric charges generated by the photodetector during the acquisition period.

FIG. 3 illustrates a detection circuit with a single photodetector 1. To form a detection matrix, it is possible to form a plurality of detection devices arranged in the form of a matrix and identical to what is presented for FIG. 3. The detection matrix comprises a plurality of detection circuits as presented in the foregoing. The detection circuits are organised in rows and columns.

It is particularly advantageous to provide for bias circuits 5 of the detection circuits to receive the same first synchronisation signal ($RSEL_{RN}$). In this way, the first periods and the second periods are synchronised for the detection matrix.

Bias circuits 5 of a line or column of detection circuits are connected to a control circuit A configured to perform simultaneous switching between the first period and the second period.

The detection matrix is formed by a plurality of detection circuits which are organised with one or more repetition pitches in one or two organisation directions, for example those of the columns and rows.

In one embodiment, the detection matrix is divided into pixels formed by the detectors associated with bias circuit 5, integration capacitor $C_{INT}$ and measurement circuit 7. The pixels are organised with one or more repetition pitches in one or two organisation directions, for example those of the columns and rows.

The detection matrix is surrounded by an area devoid of detectors. This area devoid of detectors presents a width at least equal to the width of a pixel, preferably a width at least equal to two pixels. The area devoid of detectors is in the form of a ring having a width at least equal to a repetition pitch, preferably at least equal to two repetition pitches.

In a particularly advantageous embodiment as it is compact, circuit 6 is removed to a location outside the photodetector matrix, which releases the volume occupied by this function on the area that is most sensitive in terms of available surface, thereby enabling the compactness of the photodetector matrix to be increased. Furthermore, this enables the major source of stray photon emission to be moved away from the photodetector matrix thereby improving the integrity of the optic signal received. The photodetector matrix is not provided with a transfer circuit 6. Transfer circuit 6 or at least the amplifier 8 of transfer circuit 6 is separated from the nearest photodetector by a distance at least equal to a repetition pitch and preferably to at least two repetition pitches.

Transfer circuit 6 is removed to a location outside the detection matrix so as to reduce or even eliminate the disturbances linked to the operation of transfer circuit 6 and more particularly to the operation of amplifier 8. This shifting of the transfer circuit enables the noise level in the detection circuit to be reduced.

In a particularly advantageous embodiment as it is compact, circuit 6 is shared between Np photodetectors, which enables the space occupied by this function in the detection matrix to be divided by Np thereby increasing the compactness.

Figure 4:
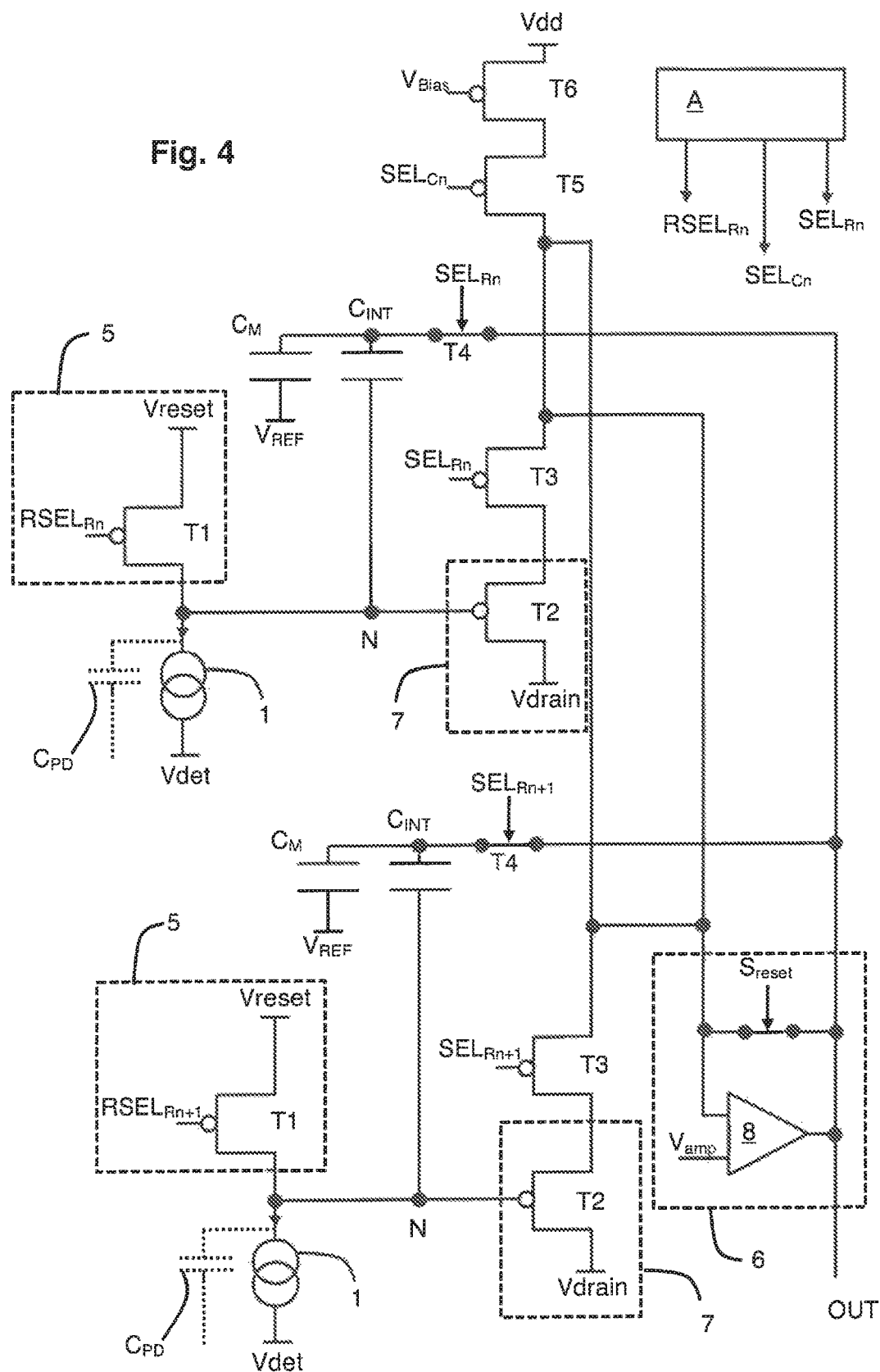
FIG. 4 represents, in schematic manner, several detection circuits according to the invention in relation with a detection matrix.

As a variant, electric charge transfer circuit 6 can be common to several detection circuits of a row or of a column. FIG. 4 illustrates sharing for a column.

If transfer circuit 6 is common to several detection circuits, the different second electrodes of capacitors $C_{INT}$ and therefore the different output terminals are connected to one and the same transfer circuit 6. In order for the bias of a capacitor $C_{INT}$ to be associated to integration node N of the same pixel, the circuit advantageously comprises a switch T4 which is connected between the second electrode of integration capacitor $C_{INT}$ and transfer circuit 6.

The control circuit and transfer circuit 6 are configured to sequentially perform transfer of the charges from integration nodes N of said detection circuits during the second period. In this way, the electric charges present in the integration nodes are transferred in sequential manner during the second period.

In advantageous manner, each detection device comprises a transistor T3 and a transistor T4 which are turned on or off depending on whether the detection device is in the transfer phase or in the integration phase of the acquisition period, i.e. the second period.

For example purposes, the column is formed by n detection devices representative of n rows of the matrix.

When switches T3 and T4 of a first detection device are in on state, the other switches T3 and T4 are in off state. In this way, each of the integration nodes N of the column can be analysed on its own without any risk of disturbance of the other integration nodes of the column.

Signal SELRn can therefore be an activation signal of switches T3 and T4 of the device of rank n of the column or more generally of all the switches T3 and T4 of rank n of the detection matrix.

In the illustrated embodiment, a single connection is used to connect the so output of amplifier 8 with all the switches T4 of one and the same column. Activating the different switches T4 sequentially makes it possible to vary the potential of one node N at a time.

In the matrix, it is advantageous to connect all the input terminals of transfer circuits 6 to a single bias source connected to voltage Vdd by means of a switch T5 selecting the required column. Switch T5 receives signal $SEL_{Cn}$ on its control electrode. In this way, it is possible to select the transfer circuits of a column without selecting the transfer circuits of the other columns.

It is also advantageous to connect a transistor T6 between voltage Vdd and switch T5 in order to adjust the bias conditions of transistor T2 in follower mode.

This detection device architecture is particularly advantageous in the field of low flux signal detection and more particularly in the field of astronomy where the collected signals are very weak.

Whereas a great deal of work has been carried out on the architecture of the photodetectors so as both to improve the integrity of the signal and to extend the range of the signal on detectors which only tolerate low bias variations, the detection device enables better results to be obtained than the two detection architectures known from the prior art, SFD and CTIA.

The photodetector can be a photodetector configured to detect a visible or infrared radiation. In the infrared range, the photodetector can be configured to detect at least one spectral band from the VLWIR, LWIR, MWIR and SWIR bands.

In the infrared range and more particularly in the LWIR band, the detection device enables the integrity of the signal to be kept over a larger operating range in comparison with architectures of the prior art.

Although the detection circuit is presented in conjunction with a photodetector, it is also of great interest for all detectors which deliver an electric signal as a function of an external stimulus, for example a pressure sensor.

The invention claimed is:

1. Detection circuit comprising:
   a detector having a stray capacitor, the detector being configured to deliver electric charges according to an observed phenomenon,
   a bias circuit configured to bias the detector during a first period and to leave a first terminal of the detector at a floating potential during a second period,
   a first capacitor having a first terminal connected to the first terminal of the detector to form an integration node with the stray capacitor, the integration node being at a potential target value during the first period and at a changing potential during the second period,
   a transfer circuit configured to transfer electric charges from the stray capacitor to the first capacitor, the transfer circuit being configured to bias a second terminal of the first capacitor so as to shift a potential of the integration node to the potential target value for transferring the electric charges and to disable transfer of the electric charges when the potential of the integration node reaches a predefined value,
   an output terminal delivering a voltage representative of the potential present on the second terminal of the first capacitor.

2. Circuit according to claim 1, comprising a measurement circuit configured to measure the potential of the integration node and wherein the measurement circuit delivers data representative of the potential of the integration node to the transfer circuit so that the transfer circuit delivers a voltage configured to transfer the electric charges from the stray capacitor to the first capacitor.

3. Circuit according to claim 2, wherein the measurement circuit comprises a follower transistor having a control electrode connected to the integration node so as to modulate a voltage delivered by the follower transistor according to the potential of the integration node.

4. Circuit according to claim 3, wherein an output of the follower transistor is connected to the transfer circuit and configured so that transfer of the electric charges from the stray capacitor to the first capacitor is stopped when the follower transistor delivers a voltage representative of the predefined value.

5. Circuit according to claim 2, wherein the transfer circuit comprises an amplifier receiving a value representative of the potential of the integration node on a first input, and a value representative of the predefined value on a second input, an output of the amplifier being connected to apply a voltage on the second terminal of the first capacitor.

6. Circuit according to claim 5, wherein the amplifier is formed by an operational amplifier and an output of the operational amplifier supplies voltage to the second terminal of the first capacitor.

7. Circuit according to claim 6, wherein the bias circuit applies a first voltage value to the first terminal of the detector during the first period and wherein the operational amplifier receives on a first input a voltage offset from said first voltage value by a value equal to a threshold voltage of a transistor connected as follower transistor.

8. Circuit according to claim 1, comprising a second capacitor having a first terminal connected to the second terminal of the first capacitor and a second terminal connected to a second voltage source delivering a fixed potential.

9. Circuit according to claim 1, comprising a transfer switch configured to enable or disable a flow of electric charges between the second terminal of the first capacitor and the transfer circuit.

10. Circuit according to claim 1, comprising a measurement switch connected between the measurement circuit and the transfer circuit.

11. Circuit according to claim 10, wherein the measurement switch and/or the transfer switch are formed by a field effect transistor.

12. Circuit according to claim 10, wherein the transfer switch and the measurement switch receive a same synchronisation signal on their control electrode.

13. Circuit according to claim 9, comprising a control circuit configured to activate the transfer circuit at least twice during the second period, the control circuit being configured to disable charge transfer between two consecutive activation phases of the transfer circuit.

14. Circuit according to claim 13, wherein the control circuit is configured to switch the transfer switch to off state between the two consecutive activation phases of the transfer circuit.

15. Detection matrix comprising a plurality of detection circuits according to claim 1 organised in rows and in columns.

16. Detection matrix according to claim 15, wherein the bias circuits of the detection circuits receive a same first synchronisation signal.

17. Detection matrix according to claim 15, characterized in that a transfer circuit is common to a plurality of detection circuits.

18. Detection matrix according to claim 17, wherein the bias circuits of a row or of a column of detection circuits are connected to a control circuit configured to perform simultaneous switching between the first period and second period and wherein the control circuit and transfer circuit are configured to perform transfer of the electric charges from the integration nodes of said detection circuits sequentially during the second period.

* * * * *